(12) United States Patent
Jacobsen

(10) Patent No.: US 7,751,621 B1
(45) Date of Patent: Jul. 6, 2010

(54) METHOD AND SYSTEM FOR RAPID OBJECT RECALL WITHIN IMAGES

(76) Inventor: Kenneth P. Jacobsen, 195 Exeter Ave., San Carlos, CA (US) 94070

( * ) Notice: Subject to any disclaimer, the term of this patent is extended or adjusted under 35 U.S.C. 154(b) by 828 days.

(21) Appl. No.: 11/668,597

(22) Filed: Jan. 30, 2007

(51) Int. Cl.
*G06K 9/34* (2006.01)

(52) U.S. Cl. ........................................ 382/173; 382/203

(58) Field of Classification Search .................. 382/103, 382/173, 276, 280, 156, 153; 386/52, 55; 381/119; 700/94; 369/253.3; 707/999.204; 209/609, 613; 375/240.28; 702/150; 701/2, 701/116

See application file for complete search history.

(56) References Cited

U.S. PATENT DOCUMENTS 6,115,480 A * 9/2000 Washizawa .................. 382/103
6,466,692 B1 * 10/2002 Washizawa .................. 382/156
7,664,339 B2 * 2/2010 Turski ......................... 382/280

* cited by examiner

*Primary Examiner*—Anh Hong Do
(74) *Attorney, Agent, or Firm*—Roger H. Chu

(57) ABSTRACT

Techniques for managing multi-dimensional spatial data are disclosed. The multi-dimensional spatial data include, but are not limited to, two- and three-dimensional imagery data, video clips, motion picture files and movies. In particular, the present invention enables the user to match sub-regions of query data with stored spatial data in a database using foveal indices. According to one aspect of the present invention, the multi-dimensional spatial data is encoded with the following technique, which segments the spatial data into overlapping samples ("foveal samples"), represents foveal samples as polar-domain foveals in a polar coordinate system, processes the foveals into a scale- and rotation-invariant canonical form ("canonical foveal"), extracts features from foveals using a mathematical transform (e.g., wavelet, beamlet), and generates and stores a set of foveal indices for each canonical foveal matching application criteria. It is emphasized that the present invention applies to multi-dimensional spatial data.

25 Claims, 14 Drawing Sheets

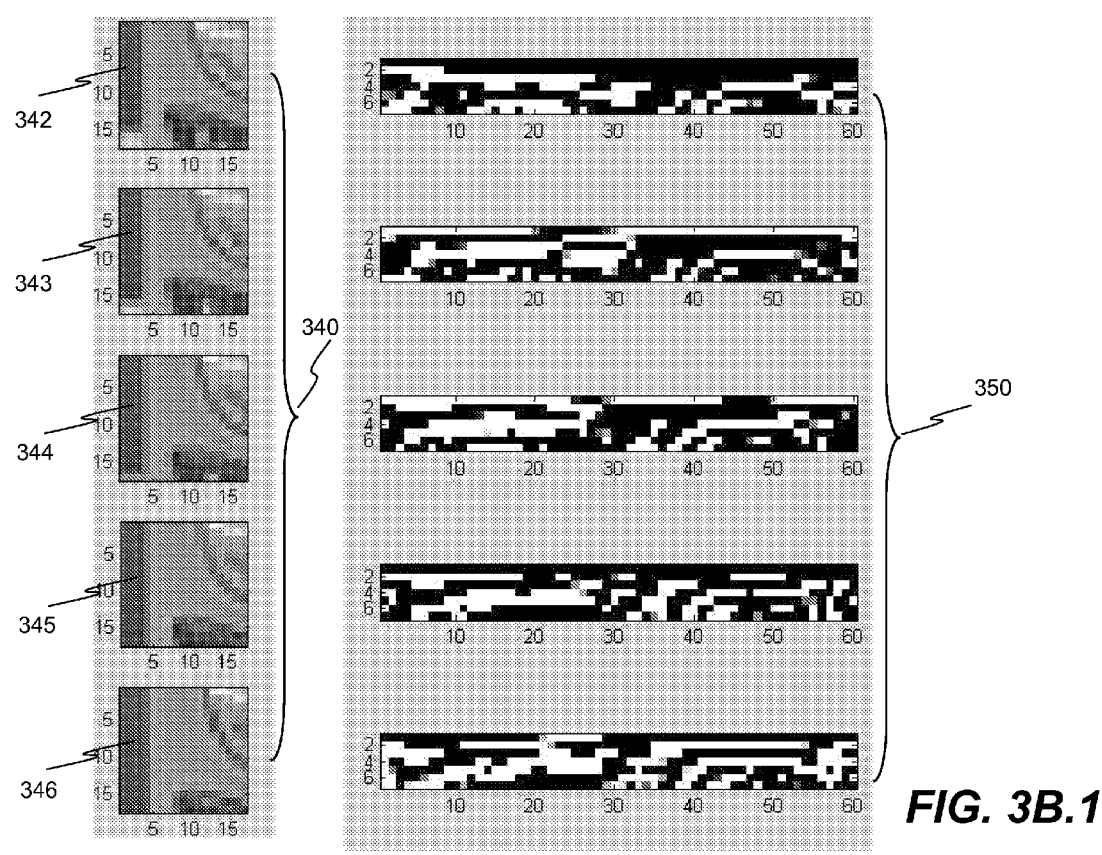
FIG. 3B.1

METHOD AND SYSTEM FOR RAPID OBJECT RECALL WITHIN IMAGES

BACKGROUND OF THE INVENTION

The invention is generally related to the area of image recognition technologies. In particular, the invention is related to a method and system for rapid object recall within images.

Data acquisition and storage capabilities are growing exponentially with no signs of slowing. According to a recent study, more than 100 billion photographs are taken each year. To store them all digitally would require 500 petabytes of storage. The imagery data explosion phenomenon is not limited to digital pictures. From the medical radiology field, the entertainment industry, the government agencies for the national security, to the NASA Goddard space center's earth science project, huge amounts of imagery data are being created and stored every day. In recent years, annual doubling in data storage capability has been the rule. In contrast, resources such as experienced minds, money, time and patience to analyze data are relatively fixed.

Currently, one of the major challenges in managing the huge amount of imagery data is related to search and retrieval of an image containing an object of interest. In general, the search is performed with user defined inefficient queries, color histograms, color moments or downsized simplified images. The traditional search puts significant burden on users to define effective queries. In addition, the traditional method does not provide an efficient means for searching today's huge imagery databases.

There is, therefore, a need for solutions that perform effective and efficient matching of objects within query imagery data against objects stored within imagery data in a database.

SUMMARY OF THE INVENTION

This section is for the purpose of summarizing some aspects of the present invention and to briefly introduce some preferred embodiments. Simplifications or omissions in this section as well as in the abstract or the title herein may be made to avoid obscuring the purpose of the section. Such simplifications or omissions are not intended to limit the scope of the present invention.

In general, the present invention pertains to management of multi-dimensional data from images and multi-dimensional data from partial images. These multi-dimensional data from images include, but are not limited to, data from two-dimensional images, data from three-dimensional images, data from video clips, data from motion picture files and movies. In particular, the present invention enables the user to match sub-regions within query data that isolate objects within these query data with stored data in a database of previously processed images using foveal indices.

Image recognition in the animal kingdom is predominantly a recall (as opposed to logical or reasoned) activity. Only elements of images that have been previously stored can be recalled. Inputs that have no resemblance to previously stored data are not recalled, but rather, stored for future retrieval operations. By focusing on the recall of fine elements of input and the relationship of these elements to each other, we drastically reduce the dimensionality of the problem and enable recognition from incomplete, obscured, or otherwise unclearly viewed subjects.

Recognition arises from the details suggesting the whole (as opposed to dissecting the whole to understand the parts). Each detail sample suggests a range of possibilities for the potential whole. Subsequent samples narrow down the range of possible identities of the subject either by confirming or eliminating plausible classifications based solely from "prior experience"—previously stored data and end-user interactions. Recognition is successful if a small number of plausible conclusions remain after a number of samples. If too many possibilities remain, more samples are considered in an attempt to narrow down the possible result. If no possibilities remain after analyzing a region, the application can either further explore or ignore the uncategorized region.

According to one aspect of the present invention, the multi-dimensional imagery data is encoded with the following technique, which segments the imagery data into overlapping samples ("foveal samples"), represents foveal samples as polar-domain foveals in a polar coordinate system, processes the foveals into a scale- and rotation-invariant canonical form ("canonical foveal"), extracts features from foveals using a mathematical transform (e.g., wavelet or ridgelet for two-dimensional imagery data, beamlet for three-dimensional imagery data, or other mathematical transforms which operate on imagery data), and generates and stores a set of foveal indices for each canonical foveal matching the application criteria. It is emphasized that the present invention applies to spatial imagery data. The terms, such as "pixel", "polar-domain foveal" and "polar coordinate system", represent or derive from the imagery data not only in the two-dimensional field, but in three-dimensional and higher-dimensional data. More recent derivative transforms, such as beamlets, ridgelets, curvelets, or contourlets, may also be applied to address imagery data with greater dimensionality or non-linear features. Other standard mathematical transformations may also be applied directly to each foveal sample, such as histogram equalization, edge or line detection, or frequency domain transformations such as Fast Fourier Transforms (FFTs) and Discrete Cosine Transforms (DCTs).

According to another aspect of the present invention, the translation-, scale-, and rotation-invariant foveal indexing mechanism allows an efficient and effective matching of sub-regions of imagery data with a plurality of the stored imagery data in the form of foveal indices. According to yet another aspect of the present invention, the matching mechanism compares all foveals contained in the original imagery data back to the query imagery data to discover sub-region matches.

In one embodiment, the present invention is directed to a method for rapid object recall within spatial imagery data, where the object is a portion of the spatial imagery data, the method includes at least the following: segmenting the spatial imagery data into at least one foveal sample, each of the at least one foveal sample has a shape and includes a plurality of adjacent pixels located at a unique position in the spatial imagery data; transforming each of the at least one foveal sample to a polar domain foveal in a local polar coordinate system; applying a mathematical transformation to the polar domain foveal to create a feature-extracted foveal; when feature density of the feature-extracted foveal is greater than a predefined threshold, creating a canonical foveal by shifting the feature-extracted foveal to a rotation-invariant orientation; and representing the canonical foveal with a set of foveal indices in a database, wherein the set of numerical foveal indices is associated with the unique textural properties of the canonical foveal.

In another embodiment, the present invention is a method for rapid object recall within spatial imagery data, the method further includes at least the following: (m) segmenting a query imagery data into one or more query foveals; (n) creating a canonical query foveal for one of the one or more query foveals; (o) calculating a set of query indices for the canonical query foveal using the same procedure as used for creation of the numerical foveal indices; (p) comparing the canonical query foveal against each of the stored canonical foveals in a respective bin of the database, wherein the respective bin corresponds to the set of query indices; (q) storing matched canonical foveal into a matched table; repeating (n)-(q) for each of the remaining of the one or more query foveals; and determining a matched image from the spatial imagery data in accordance with a set of matching rules.

In yet another embodiment, the present invention is a system for rapid object recall within spatial imagery data, where the object is a portion of the spatial imagery data, the system includes at least the following: an I/O interface; a communication interface; a secondary memory; a main memory for storing computer readable code for an application module; at least one processor coupled to the main memory, the secondary memory, the I/O interface, and the communication interface, said at least one processor executing the computer readable code in the main memory to cause the application module to perform operations of: segmenting the spatial imagery data into at least one foveal sample, each of the at least one foveal sample has a shape and includes a plurality of adjacent pixels located at a unique position in the spatial imagery data; transforming the each of the at least one foveal sample to a polar domain foveal in a local polar coordinate system; applying a mathematical transformation to the polar domain foveal to create a feature-extracted foveal; when feature density of the feature-extracted foveal is greater than a predefined threshold, creating a canonical foveal by shifting the feature-extracted foveal to a rotation-invariant orientation; and representing the canonical foveal with a set of foveal indices in a database, wherein the set of numerical foveal indices is associated with the unique textural properties of the canonical foveal.

In yet another embodiment, the present invention is a computer program product including a computer usable medium having computer readable code embodied in the medium for causing an application module to execute on a computer for rapid object recall within spatial imagery data, where the object is a portion of the spatial imagery data, the computer program product includes at least the following: computer readable code for segmenting the spatial imagery data into at least one foveal sample, each of the at least one foveal sample has a shape and includes a plurality of adjacent pixels located at a unique position in the spatial imagery data; computer readable code for transforming the each of the at least one foveal sample to a polar domain foveal in a local polar coordinate system; computer readable code for applying a mathematical transformation to the polar domain foveal to create a feature-extracted foveal; when feature density of the feature-extracted foveal is greater than a predefined threshold, computer readable code for creating a canonical foveal by computer readable code for shifting the feature-extracted foveal to a rotation-invariant orientation; and computer readable code for representing the canonical foveal with a set of foveal indices in a database, wherein the set of numerical foveal indices is associated with the unique textural properties of the canonical foveal.

One of the objects, features, and advantages of the present invention is to effectively and efficiently match a sub-region of query imagery data with stored spatial imagery data. Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF SPECIFIC EMBODIMENTS

Figure 1:
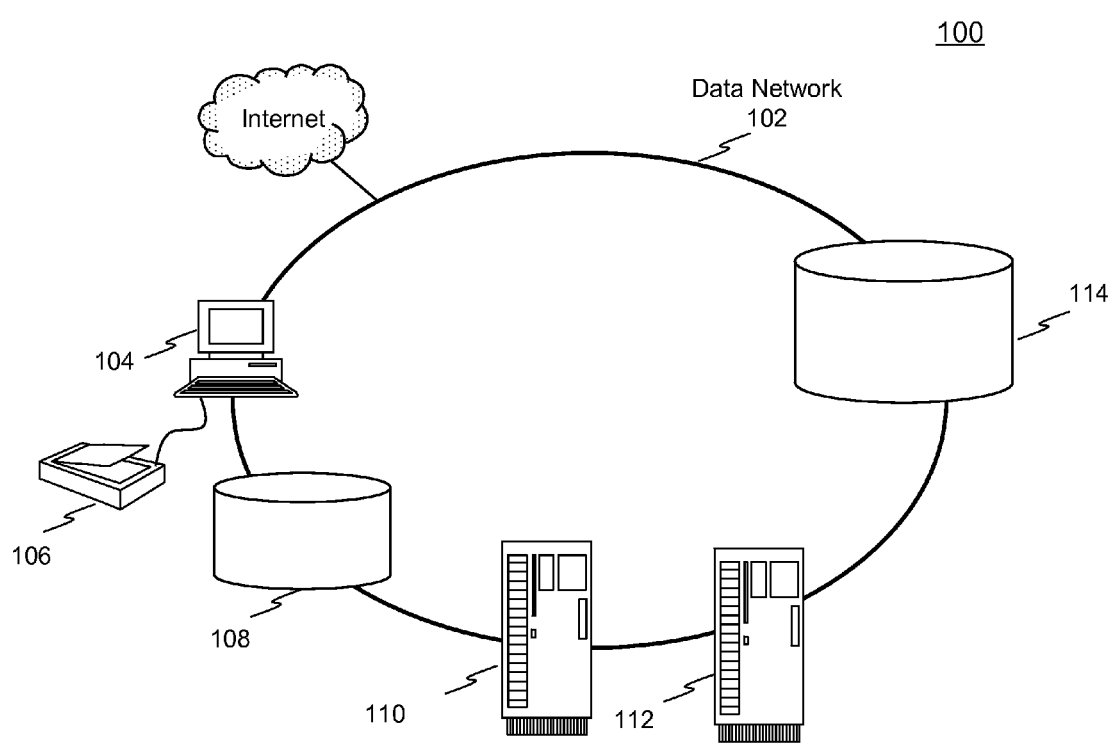
FIG. 1 is a simplified diagram showing an exemplary configuration in which one embodiment of the present invention may be practiced.

The present invention pertains to techniques for managing spatial imagery data by calculating a plurality of integer indices ("foveal indices") for the high feature density sub-regions of the imagery data, and for rapid perceptual matching of a sub-region of a query data with these indices. Although specifically applied to two-dimensional and three-dimensional imagery data, this invention is not limited to two-dimensional imagery and three-dimensional imagery data. According to one aspect of the techniques, the basic token for recognition is a relatively small sample of the input data. For imagery data, this token is a local sample of the image. This sample can be likened to the detailed central region a human experiences in one's vision. These small local samples are called "foveals", named after the narrow central field of the retina that resolves the greatest visual detail. The indices for high feature density foveals are referred to as foveal indices. For two-dimensional imagery, a foveal is defined as a group of adjacent pixels with arbitrary shape and size.

According to another aspect of the techniques, a process of rapid perceptual matching is achieved by the comparison between the foveal indices of a sub-region of the query data and the foveal indices database. Only a relatively small number of the foveal samples need to be compared with the foveal indices to match an image region.

The detailed description of the present invention is presented largely in terms of procedures, steps, logic blocks, processing, or other symbolic representations that directly or indirectly resemble the operations of the device or system that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it is deemed necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

"Spatial data" and "Multi-dimensional spatial data" are used interchangeably and represent the non-textual data referred in the present invention. The exemplary spatial data are two-dimensional imagery data and three-dimensional imagery data.

"Pixel" represents a point in spatial data. In one embodiment, a pixel represents a point in a two-dimensional image. In another embodiment, "voxel" represents a point from three-dimensional imagery data.

"Foveal sample" is a grouping of adjacent pixels taken as a sample of spatial imagery data.

"Polar coordinate system" is referred as the circular coordinate system for two-dimensional or spherical coordinate system for three-dimensional or higher dimensional coordinate system.

"Polar-domain foveal" is referred to a foveal sample that is represented in a "Polar coordinate system". In one embodiment, the detailed representation is shown in FIG. 3C.

Referring now to the drawings, FIG. 1 shows an exemplary configuration 100 in which the present invention may be practiced. To facilitate the understanding of the present invention, it is assumed that the configuration 100 represents a corporation's intranet. There are a number of server computers, or servers, of which two examples 110 and 112 are shown. Each of the computers is coupled to a data network 102. The servers 110 and 112 may be located in the data center connecting to a high speed network to serve the whole corporation, or they may be located in two locations far apart from each other to serve the users located in each server's local geography. Coupling to the network 102, one example of a client computer or client 104, and two examples of storage devices 108 and 114 are also shown. Connecting to the client 104 is a scanning device 106, which facilitates the conversion of analog data (e.g., photos, books, newspapers) into digital data. The scanning devices may include, but not be limited to, devices such as scanners, cameras, movie-cameras, video recorders, or three-dimensional digitizers. The digital data is transmitted to the client 104 for further usage such as adding the digital data into a database. The client 104 provides an interface for users to access the devices and application modules executed on the computing devices across the network 102. The client computing device 104 may include, but is not limited to, a desk top computer, a lap top computer, or a hand-held computing device.

The storage devices 108 or 114 may be direct attached storage (DAS), network attached storage (NAS), or storage network (SAN). These storage devices provide data storage supplemental to the hard disk storage or direct attached storage device to the computing devices. In one embodiment, the storage devices 108 and 114 provide storage space for a massive database's data tables. For example, spatial imagery data may be stored in the storage device 114, while a database containing a group of foveal indices in accordance to the present invention may be stored in storage device 108. In another embodiment, the spatial imagery database and the foveal indices database may be located on the same storage device or on separated storage devices.

The network 102 may be a wired network, a wireless network or a combination of both. In one embodiment, all devices including the servers 110, 112 and client 104 are coupled to a local area network (LAN). In another embodiment, all devices could be connected across a wide area network (e.g., the Internet). Many devices (e.g., the servers 110, 112 and client 104) on the network 102 are configured to retrieve and store data (e.g., digital images). For example, the client 104, and the servers 110 and 112 can download digital spatial data from the Internet and store the downloaded data locally for sharing with other devices on the Internet or the network 102.

The application module, in accordance to the present invention, may be executed on at least one of the computing devices (e.g., the server 110, 112, the client 104, or the like). In one embodiment, the database software is loaded on the server 112, the spatial imagery database is stored on the storage device 114, the application module for the present invention is loaded and executed on the server 110, an input interface to the application mode is executed on the client 104, and the foveal indices database is stored on the storage device 108. New spatial imagery data is received in the client 104. The user sets a number of control parameters and criteria via the input interface from the client computer 104. The application module executed on the server 110 will perform the tasks of creating foveal indices for the new spatial data according to the control parameters and criteria. As a result of the computing tasks, the foveal indices are stored into a foveal database on the storage server 108. The spatial imagery data are inserted into the spatial imagery data database residing in storage server 114.

In another embodiment, the user wishes to search the spatial imagery data database to see if there is a match for query data just received. The user starts the process at client computer 104 by issuing a set of commands to control the matching criteria. The query data will be processed by the application module executed in the server 110. A set of foveal indices of the query data is compared with the stored foveal indices to find matches. Any match between the query data and the spatial imagery data database is reported back to the user via the input interface. More details about how the present invention works are described below.

Figure 2:
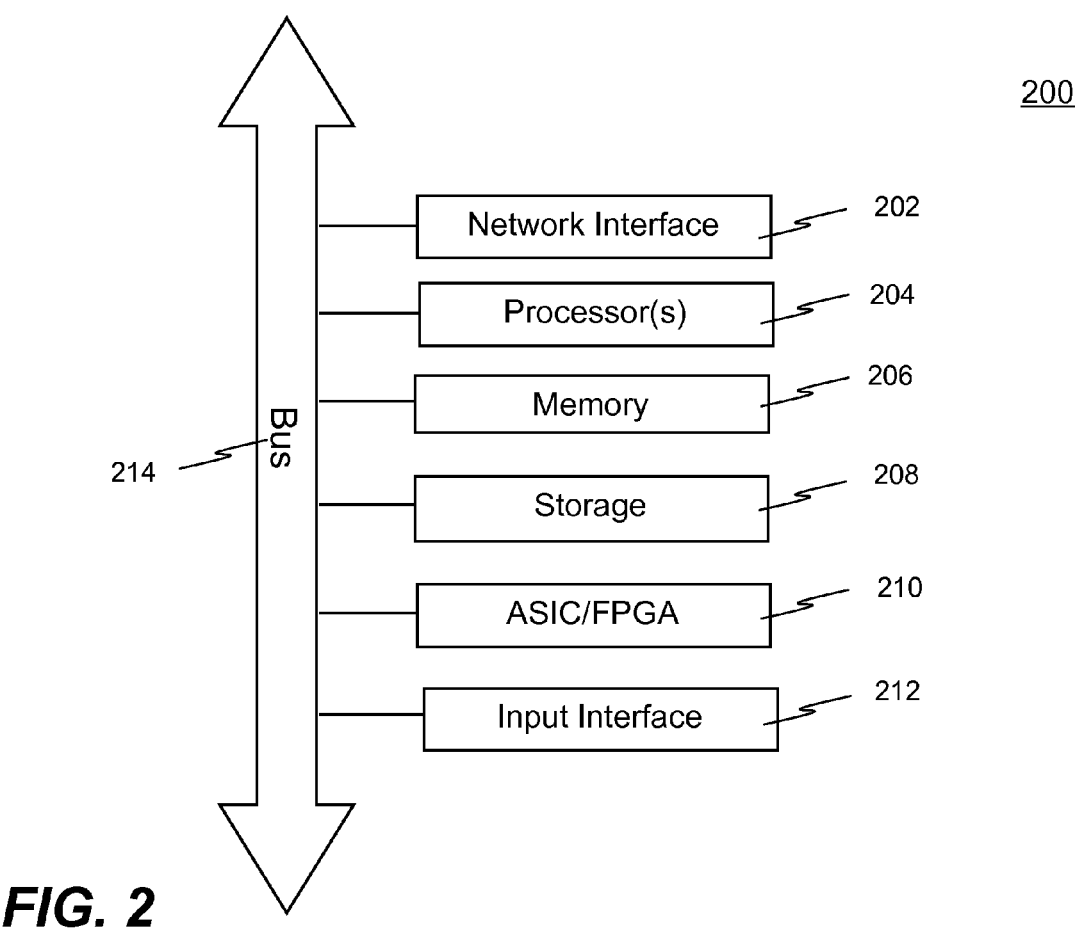
FIG. 2 is a simplified schematic diagram showing some of the components of a computing device in accordance with one embodiment of the present invention.

FIG. 2 shows an exemplary functional block diagram of a computing device 200 in accordance with the present invention. The computing device 200 includes a network interface 202, at least one processor 204, a memory 206, a hard disk storage 208, and/or a special function integrated circuit 210 (e.g., Application specific integrated circuit, ASIC or field programmable gate array, FPGA). For a client computer, a user input interface 212 is usually included. To facilitate the communication within the computing device, a local bus 214 is provided. The network interface 202, the processor 204, the memory 206, the hard disk 208, the ASIC/FPGA 210 and the user input interface 212 are all coupled to the local bus 214 either directly or indirectly through other printed circuit boards. The network interface 202 facilitates a data flow between a data network (e.g., the data network 102 of FIG. 1) and the computing device 200 and typically executes a special set of rules (i.e., a protocol) to send data back and forth. One example of a protocol is TCP/IP (Transmission Control Protocol/Internet Protocol) commonly used in the Internet. In general, a network interface manages the assembling of data or files into smaller packets that are transmitted over the data network, or reassembles received packets into the original data or file. In addition, the network interface 202 handles the address part of each packet so that it gets to the right destination, or intercepts packets destined for the computing device 200.

In particular, the network interface 202 allows the computing device 200 to send or receive information such as database manipulation commands from other computing devices on the data network (e.g., the network 102 of FIG. 1). At least one processor 204 is configured to control the operation of other parts in the computing device 200. The memory 206 may be loaded with one or more software modules that can be executed by processor 204 to achieve desired tasks. According to one aspect of the present invention, a software module implementing one embodiment of the present invention is executed in the processor 204, which operates in accordance with the software module with a set of input parameters to generate a set of indices for spatial data.

The hard disk storage 208 may be located within a computing device 200 or it may be located outside of the computing device. The communication between the outside hard disk storage and the computing device may include, but not be limited to, a direct link, a fiber channel, or a high speed network. In one embodiment, the hard disk storage 208 is used to store an indices database table that may be retrieved for lookup and matching at any time (e.g., database 108 of FIG. 1). In another embodiment, the hard disk storage 208 is used to store a spatial imagery data database 114 of FIG. 1.

The special function integrated circuit 210 may be used to perform some of the most compute intensive functions. In one embodiment, an ASIC or FPGA may be deployed to handle the mathematical transform (e.g., wavelet transform for two-dimensional imagery data or beamlet transform for three-dimensional imagery data) that the present invention deploys to extract the features in a foveal. For example, if the ADV202 chip from Analog Devices, Inc. was implemented to calculate the wavelet transform, the compute time would accelerate the wavelet transform solution time by approximately 100-fold comparing to an implementation based on software alone.

Depending on the computing device, the input interface 212 may include, but not be limited to, a monitor, a keyboard, and a pointing device (e.g., mouse). In particular, the input interface enables the user to control the input to the application module and monitor the progress of the tasks performed by the application module. In one embodiment, the input interface 212 allows the user to communicate with other devices on the network 102 of FIG. 1 and to control any device directly connected to the computing device (e.g., scanning device 106 of FIG. 1).

Figure 3A:
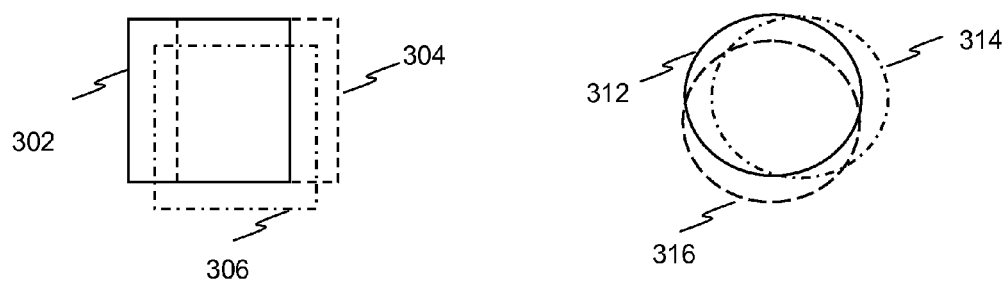
FIG. 3A is a diagram showing exemplary shapes of foveal samples used in accordance with one embodiment of the present invention.

Referring now to FIG. 3A, there are shown a number of exemplary foveal samples. One of the advantages of the present invention is that the matching is translation-invariant. In order to achieve translation-invariance, a set of overlapping foveal samples must be taken from spatial imagery data systematically so that any translational difference between query data and the stored data can be captured. In one embodiment, a set of square foveals 302, 304 and 306 are shown. The size of the square foveals is 15 pixels wide. The sample 304 is taken 5 pixels apart in the horizontal direction from the sample 302, and the sample 306 is 1-pixel apart in both horizontal and vertical directions. The frequency of sampling is application dependent and data dependent. The highest sampling frequency is taking samples at every pixel shift. The present invention does not impose any limitation as to how many samples or the frequency that samplings must be taken for foveal samples. The second set of foveal samples has a circular shape 312, 314 and 316. Similar to the square set, these samples are overlapped with one another. In one embodiment, the sample 312 is a circle with an 8-pixel radius. The sample 314 and the sample 316 are taken four pixels apart in horizontal and vertical direction respectively.

Figure 3B:
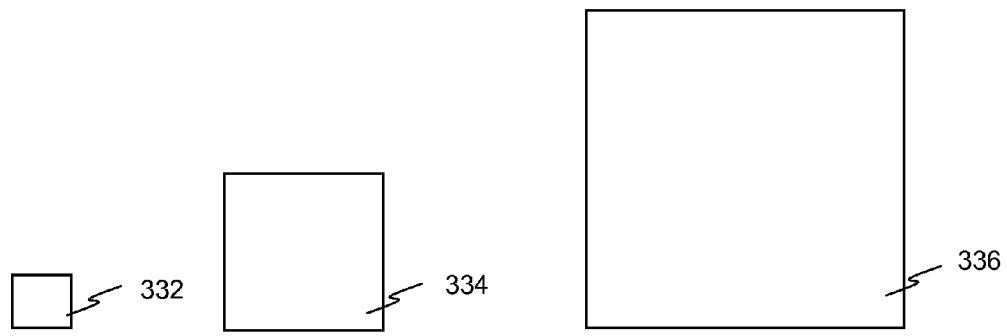
FIGS. 3B and 3B.1 are diagrams showing exemplary alternate scales of foveal in accordance with a couple of embodiments of the present invention.
Figure 3C:
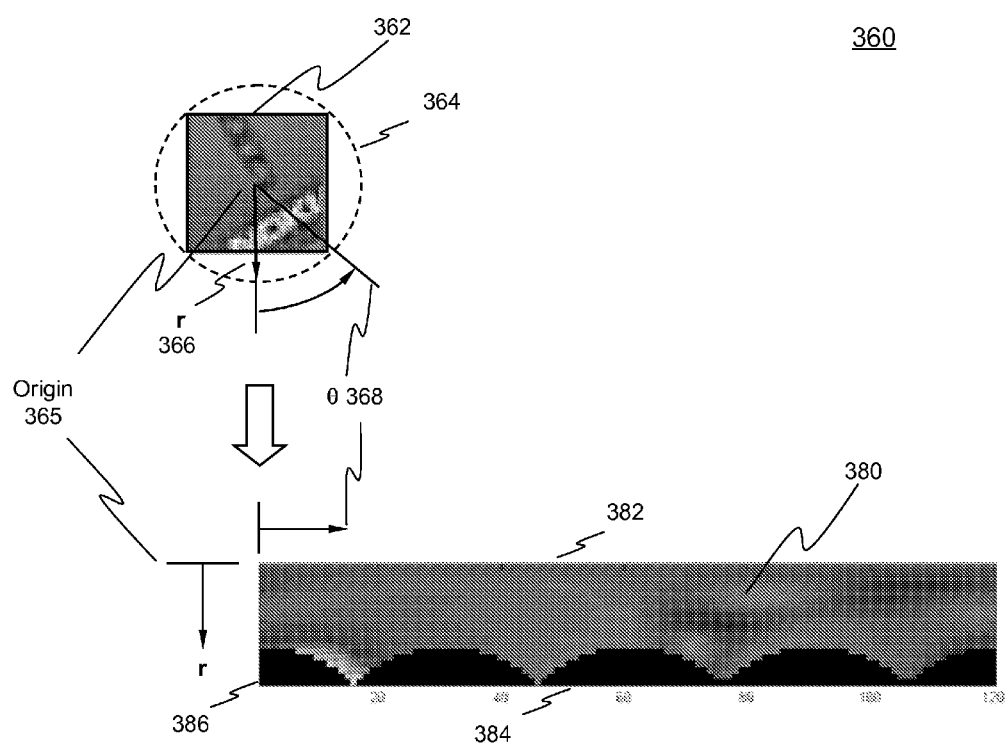
FIG. 3C is a diagram illustrating an exemplary representation of a foveal in a polar coordinate system in accordance with one embodiment of the present invention.

FIGS. 3B and 3B.1 show an exemplary set of foveal samples with different scales in accordance with a couple of embodiments of the present invention. One of the advantages of the present invention is that the matching is scale-invariant. In order to accommodate the different distances that spatial data may be captured from a source (e.g., camera or recording device), foveal samples at different scales must be stored. A range of pixel regions larger than the target foveal size are sampled. Each sample is resized to match the target foveal size and subsequently transformed into their canonical form, indexed, and stored. In one embodiment as shown in FIG. 3B, the size of the target foveal 332 is 9-pixel wide, and two larger scale foveals 334 and 336 are sampled at 17-pixel and 33-pixel, respectively. One of the reasons for selecting larger scale foveals at 2× zoom is that when a wavelet transform is calculated for the target foveal 332, the wavelet coefficients for foveals 334 and 336 at 2× zoom are readily available. In another embodiment, FIG. 3B.1 illustrates a series of different scaled foveals 340 and corresponding canonical forms 350. The target foveal 342 is 17-pixel wide, other foveals 343, 344, 345 and 346 are sampled at 18-, 19-, 20- and 21-pixel wide, then resized to 17-pixel before transforming into corresponding canonical forms 350.

FIG. 3C illustrates a representation of an exemplary foveal sample 362 in the polar coordinate system. A square foveal sample 362 is first circumscribed by a circle 364. The polar coordinate system is defined by a radial r 366 at 0 degrees and moving counterclockwise 370 towards a radial 368 at θ degrees. The central portion of the foveal sample is excised into a rectangular shape 380, which is referred to as a "polar-domain foveal" hereinafter. The top edge 382 of the polar-domain foveal is the origin 365 of the circumscribed circle 364, which coincides with the center of the foveal sample 362. The bottom edge 384 represents the perimeter of the foveal sample 362. The left edge 386 represents the radial 366 at 0 degrees.

Figure 3D:
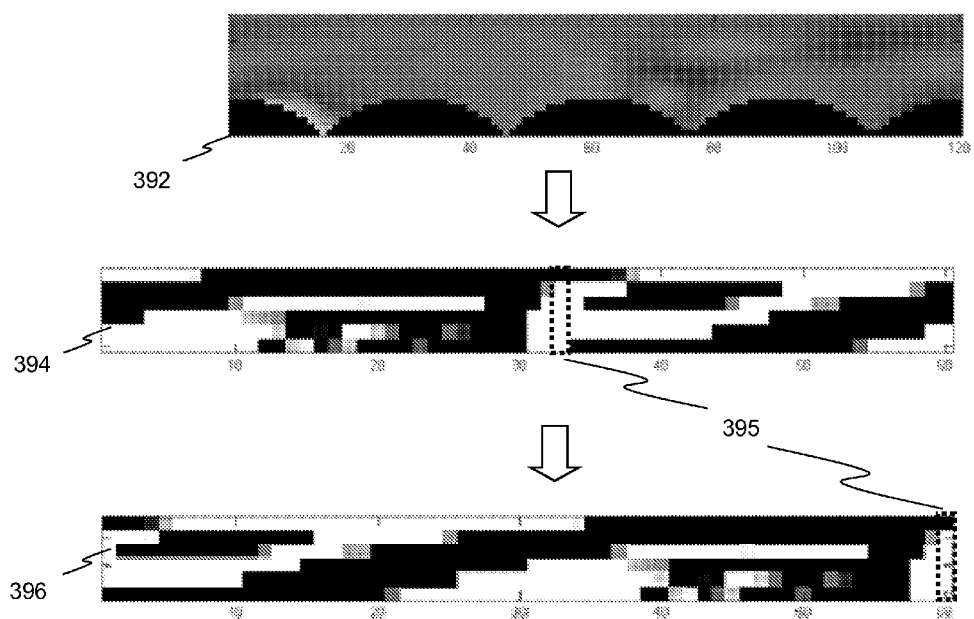
FIG. 3D is a diagram showing a sequence of operations in accordance with one embodiment of the present invention for generating canonical foveals.

FIG. 3D shows a sequence for generating a foveal in canonical form 396 from a polar-domain foveal 392 in accordance with the present invention. In favor of the concise description, the foveal in canonical form will be referred to as a "canonical foveal" 396 hereinafter. A polar-domain foveal 392 is a representation of a foveal sample in the polar coordinate system. After applying the mathematical transform such as a wavelet transform in horizontal, vertical and diagonal directions, the resulting foveal is called feature-extracted foveal as shown as 394, which shows the features have been extracted via the wavelet transform. Then the calculated wavelet coefficients for the horizontal, vertical and diagonal are summed for each column of the resulting foveal after the mathematical transform. The highlighted column 395 indicates the position at which the highest sum of wavelet coefficients in that column is located. This position is equivalent to the radial that has the highest feature response to the wavelet transform. In order to achieve rotation-invariant matching, the foveal 394 is rotated or shifted to a particular orientation that is predefined by users. In one embodiment, the particular orientation is shown as the orientation 396 in which the column 395 is located at the right most position of the feature-extracted foveal. The rotation-invariant foveal (e.g., foveal 396) is referred to as the canonical foveal.

Figure 4A:
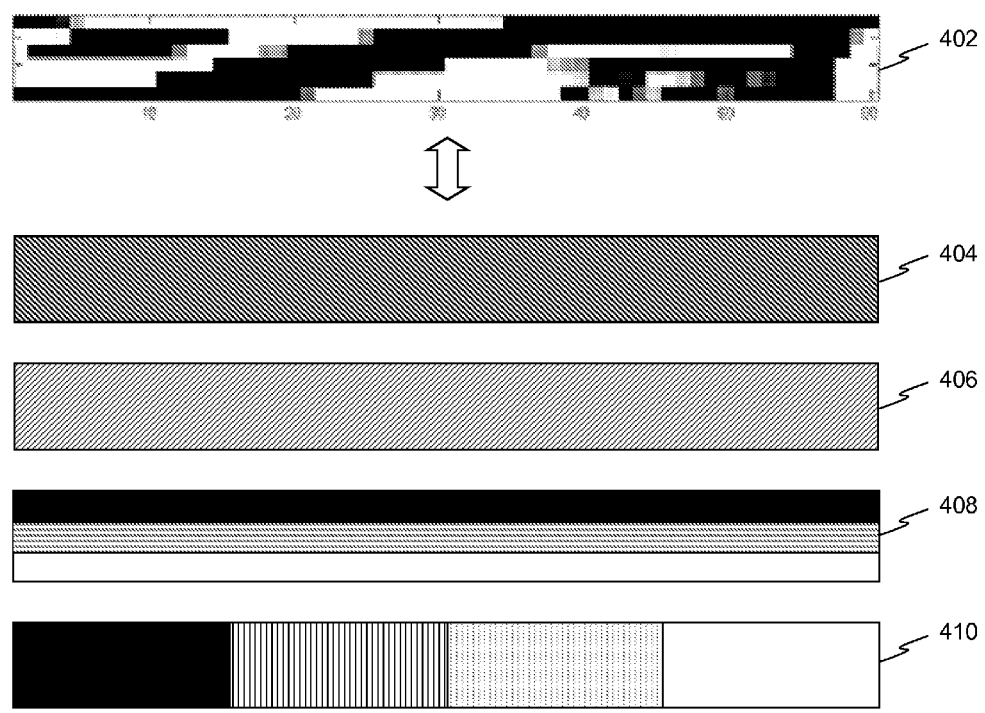
FIG. 4A is a diagram showing a set of exemplary reference foveals used for calculating foveal indices of a canonical foveal in accordance with one embodiment of the present invention.
Figure 4B:
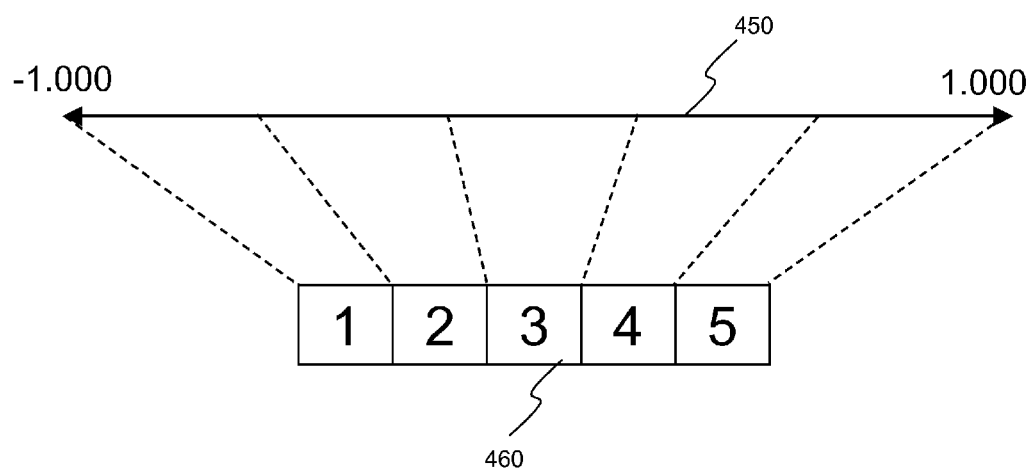
FIG. 4B is a diagram showing an exemplary indexing scheme according to one embodiment of the present invention.

Referring now to FIG. 4A, there is shown a set of exemplary reference foveals 404, 406, 408 and 410 in accordance with one embodiment of the present invention for calculating foveal indices for a canonical foveal 402. In order to efficiently represent the canonical foveal in a numerical form, a set of foveal indices is calculated. First, a set of pre-determined known reference foveals are selected. The set of reference foveals 404, 406, 408 and 410 may be in different shades of gray scale, or in different patterns. In one embodiment, the pattern of reference foveals is in one constant value 404, 406. In another embodiment, the pattern is in a sequence of different values 408, 410. Then a set of cross-correlation coefficients between the canonical foveal and each of the reference foveals is calculated. These coefficients have a range between negative one and positive one. If the canonical foveal is exactly the same as a reference foveal, the coefficient will be equal to positive one. On the contrary, if the canonical foveal is 100% opposite to a reference foveal, the coefficient is negative one. As the coefficient for each reference foveal is calculated, a set of foveal indices representing the canonical foveal is created. Each index is calculated by mapping the range of cross-correlation coefficients to a range of positive integers. In one embodiment, there is an exemplary mapping as shown in FIG. 4B. The cross-correlation coefficient 450 with a range between −1 and 1 is mapped to an array of integer indices 460 from 1 to 5. The number of integer indices and the number of the reference foveals used to classify a foveal into a set of foveal indices is database size dependent. In one embodiment, six reference foveals may be chosen instead of four used in FIG. 4A. In another embodiment, 20 integers are chosen to map the cross-correlation coefficients instead of 5 used in FIG. 4B. Additional reference foveals and integer indices speed up database matching by reducing the number of candidate foveals for comparison and increase the useful capacity of the database. For example, using a 5 reference foveal with 7 integer index scheme, a foveal indices may look like [4,7,1,5,3], [1,2,7,4,2], or [4,5,6,7,7]. In another embodiment, an alternate indexing method (i.e., self-indexing) is used for calculating foveal indices without any reference foveals. For example, foveal indices are calculated directly from the canonical foveal using average pixel intensities in various regions of the canonical foveal. The number of regions in the canonical foveal would then correspond to the number of reference indices and the averaged pixel intensities would be scaled to correspond to the range of the desired foveal index.

Figure 5A:
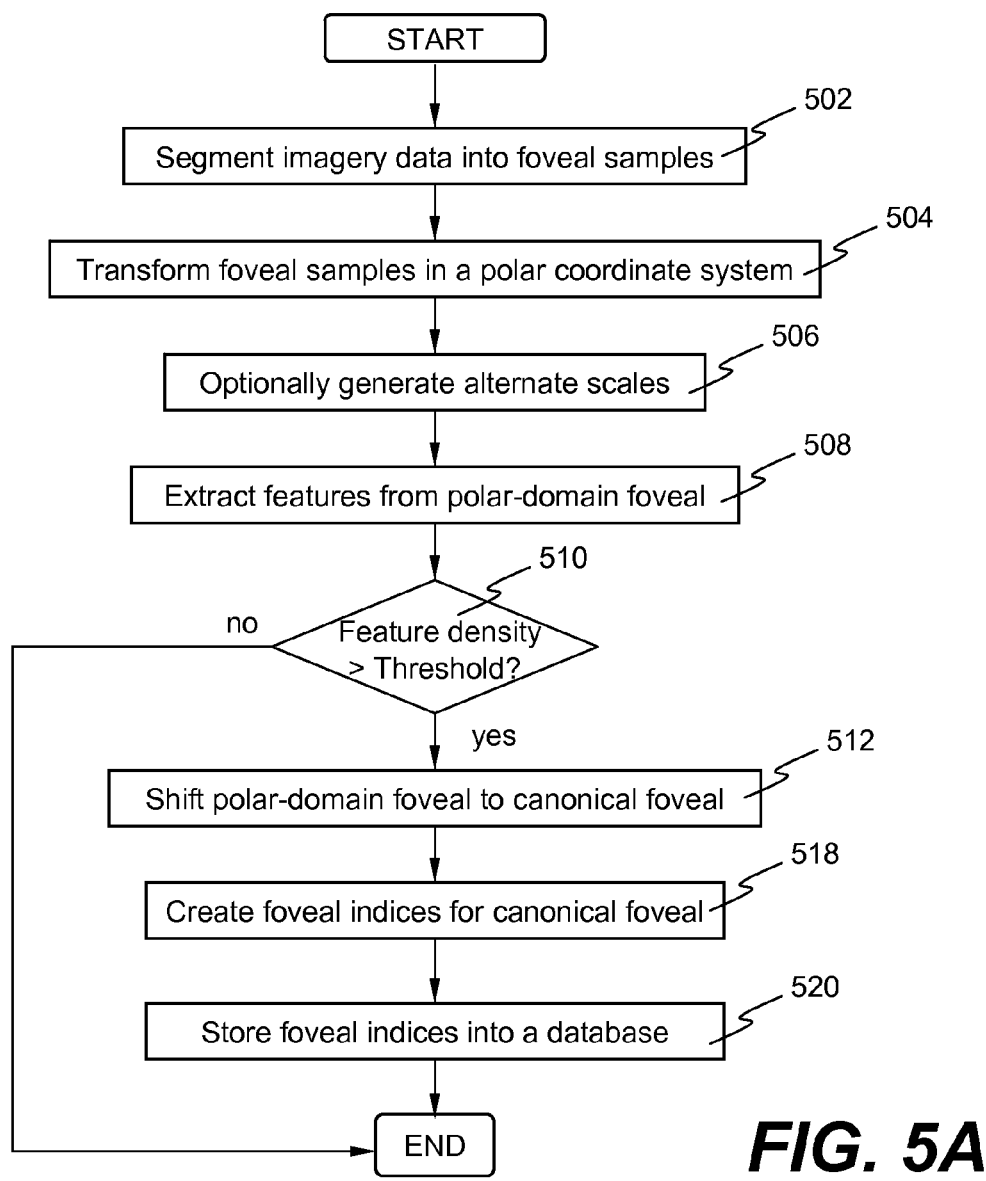
FIG. 5A is a flow chart showing the process of the initial creation of the foveal indices database according to one embodiment of the present invention.

FIG. 5A is a flowchart showing the process 500 of implementing one embodiment of the present invention for generating foveal indices and a foveal database. The process 500, which is preferably understood in conjunction with the previous figures, may be implemented in software, hardware, or a combination of both. According to one embodiment, an application software module implementing the process 500 is embedded in a computing device, for example, the server 110 of FIG. 1. The software module may be loaded in the memory 206 of FIG. 2 to be executed by one or more processors 204 and operating in conjunction with spatial imagery data and a set of user input parameters through the network 102. The input parameters may be created in a client 104. The exemplary sources of the spatial imagery data may include the scanned image from the scanner 106, the data from the spatial data database storage server 114, or the spatial imagery data received from the Internet. According to another embodiment, the software module may be loaded on more than one server (e.g., servers 110 and 112). In reality, the present invention may be executed in a massively parallel computing environment by either a multi-processor computing device or multiple computing devices or a combination of both.

The process 500 starts with taking samples of spatial imagery data at 502. The shape and size of the foveal samples and sampling interval are defined by the input parameters. The foveal samples generally are overlapping groups of adjacent pixels in a two-dimensional or three-dimensional imagery data (e.g., the exemplary foveals of FIG. 3A). According to one aspect of the present invention, taking the overlapping foveal samples ensures the high possibility of achieving translation-invariant matching. At 504, each of the foveal samples is represented as a polar-domain foveal in the polar coordinate system. A rotation-invariant foveal is created using the polar-domain foveal. The details for creating polar-domain foveals have been described in the section for FIG. 3C. At 506, a group of polar-domain foveals is generated at alternate scales to achieve scale-invariant matching. This is an important task to facilitate the spatial imagery data acquired from different distances or at different magnifications. In order to extract features from these polar-domain foveals, a mathematical operation is applied to these polar-domain foveals at 508. In one embodiment, a wavelet transform is employed in one incidence while a ridgelet transform is used in another. The wavelet transforms for horizontal, vertical and diagonal direction are applied to each polar-domain foveal. For example, an exemplary transformed polar-domain foveal 394 is shown in FIG. 3D. Because mathematical transforms such as wavelet transform are compute intensive, hardware assisted calculations can improve the computing efficient by many fold, in some case, more than 100-fold for the wavelet transform calculation itself. In one embodiment, the wavelet transform can be calculated using an ASIC (e.g., ADV202 chip from Analog Devices, Inc.). Because the wavelet transform is calculated in three directions for each polar-domain foveal for a number of different scales, parallel computing can definitely be employed. In fact, multiple foveal samples may be processed in parallel also.

At test 510, the feature density of the polar domain foveal is compared with a pre-determined threshold, only the high feature density foveals are kept. In one embodiment, each pixel of the image is in gray scale represented between 0 and 255, the average and standard deviation of the gray scale can be computed for all of the pixels in a given polar domain foveal. The high feature density may be defined as a polar domain foveal has a standard deviation greater than a predefined percentage. When the test 510 is false, the process 500 ends for those foveals that do not exhibit sufficient feature density. Else, for the foveals showing sufficient feature density, the process 500 follows the "yes" branch to 512, in which the polar domain foveals are shifted/rotated to a rotation-invariant position with the highest feature column at the right edge as shown in FIG. 3D. This shifting/rotating ensures the rotation-invariance matching of the foveal. In one embodiment, the highest feature column is defined as the highest sum in a specific column of the polar representation of the foveal of the wavelet coefficients calculated from the horizontal, vertical and diagonal directions. The foveal sample that has been transformed into translation-, rotation-, scale-invariant form is referred to as the "canonical foveal".

At 518, the process 500 creates a set of numerical foveal indices to represent each of the canonical foveals. There are a number of procedures to conduct this task. One of which is to correlate the canonical foveal to a set of reference foveals described in the section of FIG. 4A. Other procedures such as self indexing scheme may also be used. After the numerical foveal indices is created, the process 500 stores the foveal indices into a database at 520. It is noted that each set of foveal indices represents a foveal sample in the spatial imagery data. This relationship is also kept in the foveal database, so that it is easy to trace back to the original stored imagery data. When a particular index scheme (i.e., number and type of reference foveals, number of the mapping integer index) is chosen, the scheme is fixed for that particular foveal indices generating process for the database. In order to match these foveal indices, the same indexing scheme must also apply to the query foveals.

Process 500 is used to generate a set of foveal indices to represent a foveal sample, which represents spatial imagery data. Storing these foveal indices into a database ensures an efficient and effective method for searching and matching query data against the stored data in the database.

Figure 5B:
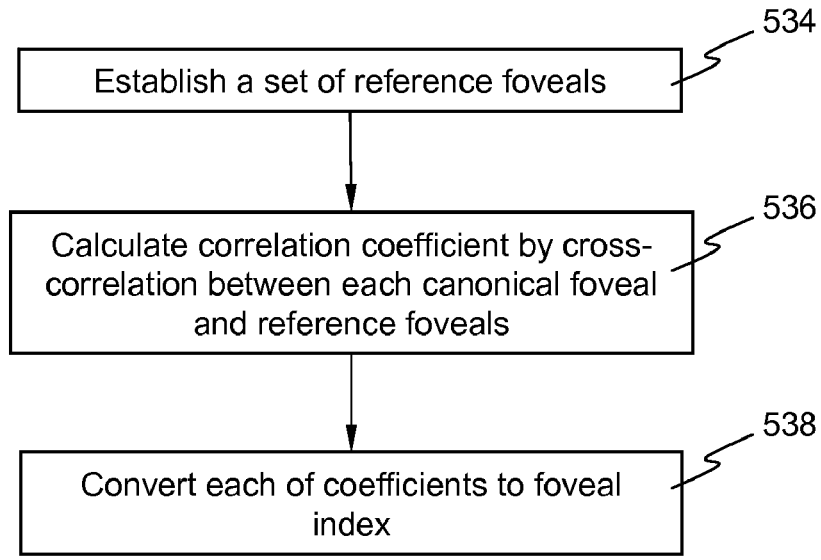
FIG. 5B is a flow chart showing the process of creating foveal indices for a canonical foveal using a set of reference foveal in accordance with one embodiment of the present invention.

FIG. 5B is a flow chart showing a process of creating foveal indices for a canonical foveal using a set of reference foveals in accordance with one embodiment of the present invention. At 534, a set of known reference foveals are selected (e.g., reference foveals 404, 406, 408 and 410 as shown in FIG. 4A) for a particular database. These reference foveals are used to classify a canonical foveal. At 536, by calculating the cross-correlation coefficient between the canonical foveal and each of the reference foveals and a set of correlation coefficients are generated to represent the canonical foveal in numerical form. It is noted that the correlation coefficient is between 1.000 and −1.000 as shown in FIG. 4B. At 538, these correlation coefficients are translated into foveal indices. In one embodiment, the correlation coefficient is labeled with an integer as foveal index by dividing the coefficient range into five different bins (e.g., FIG. 4B).

Figure 5C:
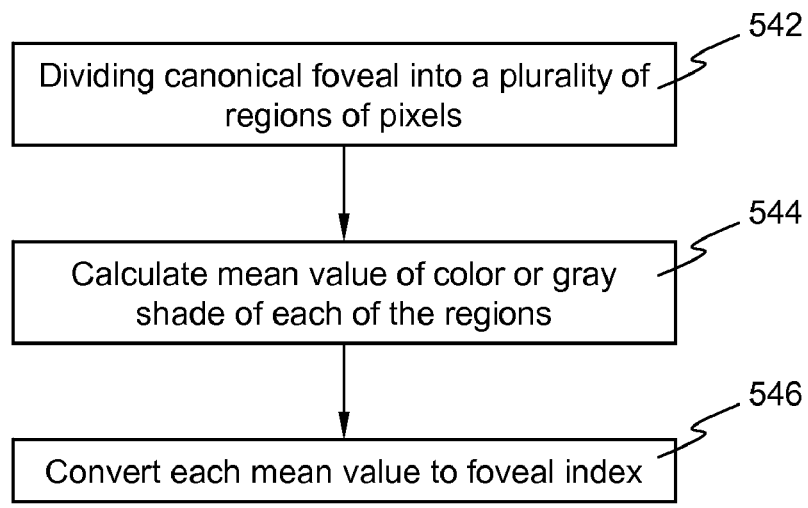
FIG. 5C is a flow chart showing the process of creating foveal indices for a canonical foveal using a sel-indexing scheme in accordance with one embodiment of the present invention.

FIG. 5C is a flow chart showing a process of creating foveal indices for a canonical foveal using a self-indexing scheme in accordance with one embodiment of the present invention. The process starts at 542 by dividing the canonical foveal into a plurality of regions. In one embodiment, the canonical foveal is divided into six equal regions. At 544, mean value of color or gray shade of all of the pixels is calculated for each of the regions. Lastly at 546, the mean value of each of the regions is converted to an integer foveal index.

Figure 6A:
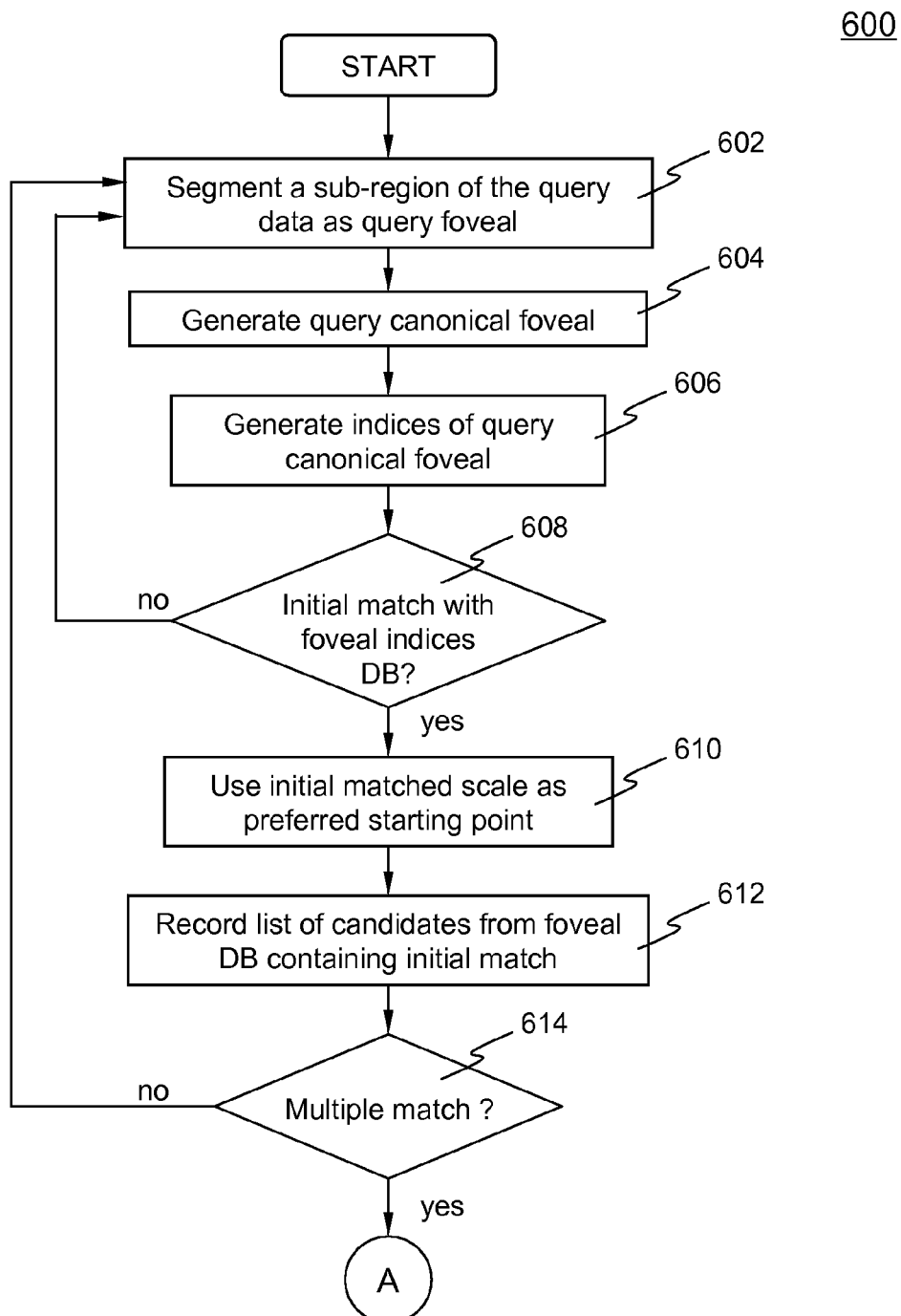
FIGS. 6A and 6B collectively show a flowchart of matching query data against a foveal indices database according to one embodiment of the present invention.
Figure 6B:
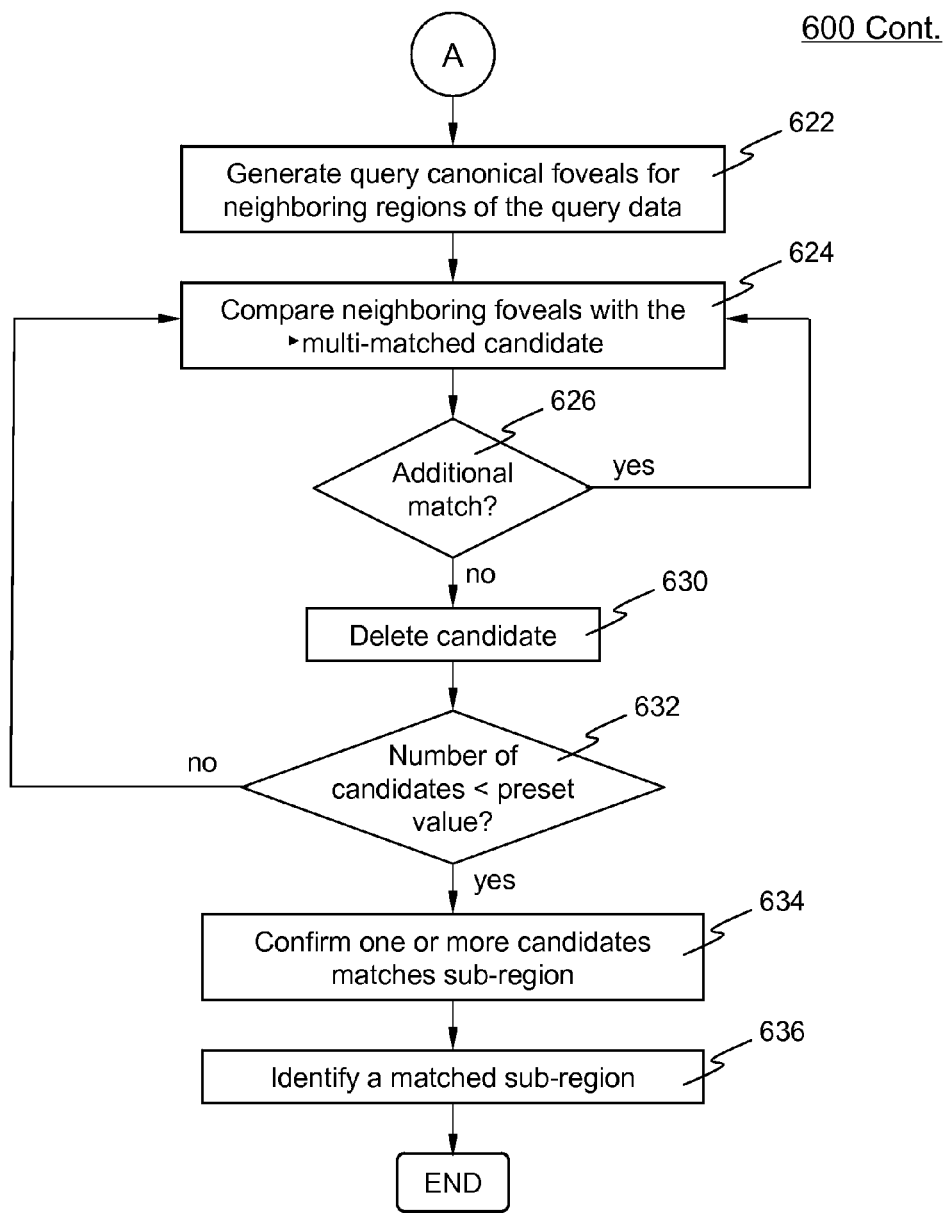

Referring now to FIGS. 6A and 6B, there is shown a flowchart or process 600 of matching query spatial imagery data with a foveal indices database according to one embodiment of the present invention. The process 600, which is preferably understood in conjunction with the previous figures, may be implemented in software, hardware, or a combination of both.

Process 600 starts by taking a group of samples of a sub-region of query data at 602. These samples are referred to as query foveals. In one embodiment, the overlapping query foveals are taken at the interval of one pixel. The scanning pattern is sequential for a comprehensive analysis. In another embodiment, the pattern is perceptual for quick pattern recognition. After taking samples of query foveals, the process 600 moves to 604. The canonical form of the query foveal is generated using the same process described above for FIG. 5. At 606, the foveal indices are calculated for the query foveal with the same indexing scheme that was used to create the foveal indices database.

Process 600 then compares the foveal indices of the query foveal with those in the foveal indices database. At 608, if there is no match, the process 600 goes back to 602 for another query foveal. If an initial match is found in the foveal indices database, the process 600 performs two following tasks. First at 610, the scale found in the initial match becomes a preferred starting scale for any subsequent comparison/matching operations. Then at 612, process 600 records a list of candidates from the foveal indices database. The candidates are the spatial imagery data that contain one foveal that initially matches the query foveal. At 614, process 600 continues to match the query foveal with those candidates in the foveal indices database. If there are no multiple matches for the candidates, the process 600 goes back to 602 taking additional query foveal for another comparison. If there are multiple matches found for a particular candidate, the process 600 performs the tasks as shown in FIG. 6B.

To accomplish "multiple matches", the following conditions must be met: 1) more than one query foveal matches the foveals from the foveal indices database, and 2) all of the matched foveals from the database are referenced to the same spatial imagery data. The particular candidate that contains multiple matches to the query data is referred to as a multi-matched candidate.

Referring now to FIG. 6B, the process 600 continues for multi-matched candidate foveals. At 622, additional query canonical foveals ("neighboring foveals") are generated for the neighboring region of the query spatial imagery data. The neighboring region is defined as the surrounding area for the previously multi-matched sub-region. At 624, these newly created query foveals for the neighboring regions are compared with all of the foveals referenced to the multi-matched candidate. At 626, the process 600 splits to two paths. If there are additional matches, the candidate is confirmed at 628. If not, the candidate is deleted from the list at 630. After comparing all neighboring foveals, the list of candidates is checked at 632. If the number of candidates is greater than a pre-determined value defined by user, process 600 goes back to 622 generating more query foveals in other neighboring regions to repeat the comparison task described above. If the number of candidates has dropped below the pre-determined value, the process 600 moves to 634 concentrating on the remaining few candidates. At 634, the foveals in the foveal indices database referenced to the remaining few candidates are matched back with all query foveals for the sub-regions that have been scanned. Based on application specific criteria determined by the user, one or more candidates may be confirmed as a match with the sub-region of the query data. Finally, these sub-regions of similarity are reported and marked as identified at 636. The process 600 continues to scan and sample another sub-region of the query data.

Figure 6C:
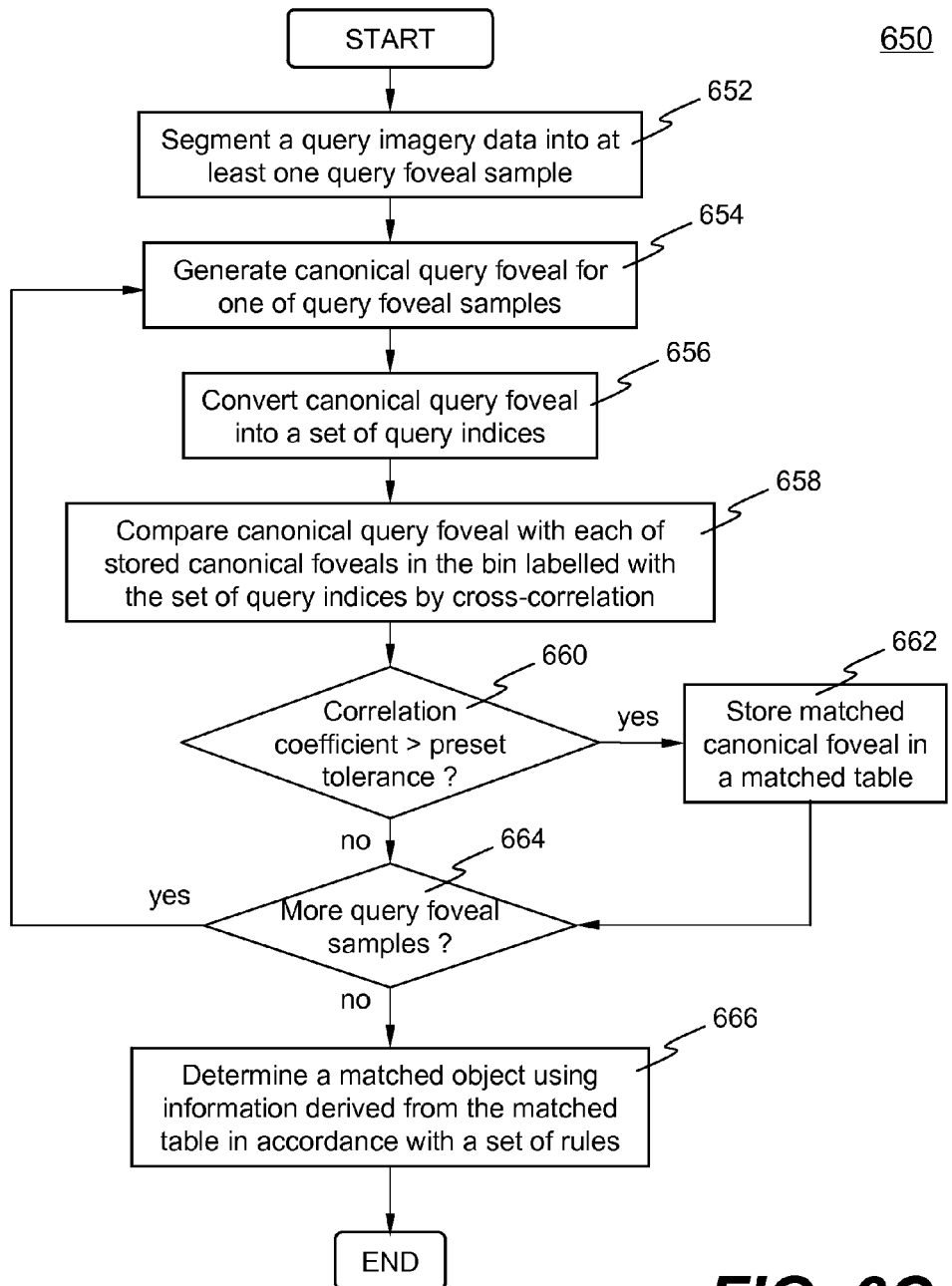
FIG. 6C is a flow chart showing the process of matching a query imagery data against stored foveals associated with a foveal indices database in accordance with one embodiment of the present invention.

FIG. 6C is a flow chart showing the process 650 for matching a query imagery data against stored foveals associated with a foveal indices database in accordance with one embodiment of the present invention. The process 650, which is preferably understood in conjunction with the previous figures, may be implemented in software, hardware or a combination of both. The process 650 starts by segmenting the query imagery data into at least one query foveal samples at 652. At 654, the process 650 generates one canonical query foveal for each of the at least one query foveal samples. Then at 656, the canonical query foveal is converted into a set of query indices. It is noted that steps 652-656 are the same procedure used in creation of the foveal database described in the section for FIG. 5A. Next at 658, the process 650 compares the canonical query foveal only with each of the stored canonical foveals in the bin labeled with the set of query indices. The rest of the database is excluded because those foveals do not have the same query indices hence they will not match. The canonical query foveal and each of the stored canonical foveals is compared by calculating a cross-correlation coefficient. The process 650 moves to test 660 in which the correlation coefficient is compared with a preset value that can be input by a user. In one embodiment, the default preset value is 80%. When the correlation coefficient is greater than the preset value, it means that the stored foveal matches, the process 650 follows the "yes" branch back to 662 to mark the matched canonical foveal in a matched table. The process 650 moves to another test 664, in which more unprocessed query foveal samples are checked. If the test 664 is true, the process 650 follows the "yes" branch back to 654 to process another query foveal sample until there are no more. Referring back to test 660, if the test 660 is false, the stored canonical foveal does not match. The process 650 moves directly to test 664 until there are no more query foveal samples. After all of the query foveal samples have been processed and compared, the process 650 determines a matched object using the information derived from the marked foveals in the matched table in accordance with a set of matching rules at 666. Once a matched object is determined, the process 650 ends. Because each of the marked matched canonical foveals can be traced back to a unique location of an imagery data, those information provide hints as to inter-relationship amongst some or all of the marked matched canonical foveals. For example, several of the marked matched foveals are from one particular imagery data; or a number of the marked matched foveals are clustered around a unique location. The set of matching rules can be defined by the user. In one embodiment, the matched imagery data is the particular one that is traced back from most of the marked matched foveals. In another embodiment, the matched imagery data is the particular one that is based on highest density clustering around a unique location.

Figure 7:
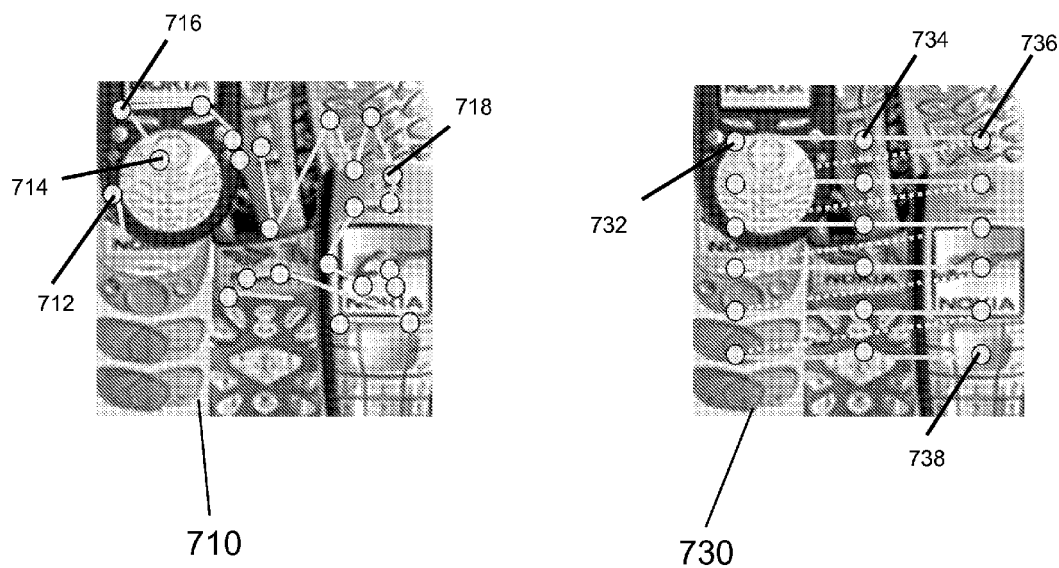
FIG. 7 is a diagram showing exemplary foveal scanning techniques in accordance with one embodiment of the present invention.

Referring now to FIG. 7, the exemplary scanning techniques in accordance with the present invention are shown. The first scanning technique 710 selects points within the query data with high feature density from which to begin pattern matching. In one embodiment, the present invention identifies feature rich sub-regions by examining the coefficients of a wavelet or ridgelet transform of the query data. Scanning proceeds from points 712 of high contrast to neighboring points 714, 716 and 718 with high feature content. This technique is called "perceptual" scanning since it resembles the scanning strategy that humans (and visually-oriented animals) use to make quick assessments of the environment. Perceptual scanning is ideal for applications where a quick, good answer is more valuable than a late complete answer. For example, consumer searches for digital photographs from an image database.

In another embodiment, a more systematic and exhaustive analysis of the data requires a sequential scanning technique 730. The scanning pattern follows a systematic scheme such as row by row. The scanning process starts at a point 732 in the upper left corner point of the query data, it then moves to other points 734, 736 and 738. For example, spotting a weapon represented in an X-ray image of a piece of luggage requires thorough analysis.

In yet another embodiment, all query foveals are calculated for the query image based upon the procedure described above for database images. The foveal data from a multi-matched candidate is compared to the query foveals. The result is an exhaustive comparison between the query and match candidates.

The present invention can be implemented in many ways, each of which may yield one or more of the following benefits, advantages or features: First, a mechanism is provided to enable a user to match arbitrary sub-regions of a query data to similar sub-regions contained in a stored spatial imagery data from a database. Second, the matching is scale-, rotation-, and translation-invariant. Third, the matching may be for a quick analysis or an exhaustive analysis. Other benefits, advantages or features can be appreciated by those skilled in the art given the detailed description herein.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the present invention can be implemented for spatial data other than imagery data such as video data. Accordingly, the scope of the present invention is defined by the appended claims rather than the forgoing description of embodiments.

What is claimed is:

1. A method executed in a computer system for rapid object recall within spatial imagery data, where the object is a portion of the spatial imagery data, the method comprising:
   segmenting each of the spatial imagery data into at least one foveal sample in a computer system, each of the at least one foveal samples has a shape and includes a plurality of adjacent pixels located at a unique position in the each of the spatial imagery data;
   transforming said each of the at least one foveal sample to a polar domain foveal in a local polar coordinate system;
   applying a mathematical transformation to the polar domain foveal to create a feature-extracted foveal;
   when feature density of the feature-extracted foveal is greater than a predefined threshold,
      creating a canonical foveal by shifting the feature-extracted foveal to a rotation-invariant orientation;
      calculating a set of foveal indices that categorizes the canonical foveal; and
      storing the canonical foveal in a database that is subdivided into more than one bins with each of the more than one bins corresponding to the set of foveal indices of the canonical foveal, wherein the database is located in a storage device coupled to the computer system.

2. The method of claim 1, wherein the at least one foveal sample overlaps one another systematically to provide translation-invariance for said each of the imagery data.

3. The method of claim 1, wherein the shape of the foveal sample includes, but is not limited to, circular, triangular, square, pentagonal, hexagonal and polygonal.

4. The method of claim 1, wherein the local polar coordinate system has an origin in the center of the each of the at least one foveal sample.

5. The method of claim 1, further comprises optionally generating a group of scaled foveals from the polar domain foveal in different scales, wherein the group of scaled foveals ensures scale-invariance.

6. The method of claim 5, wherein the different scales are set in various increments including, but not limited to, every pixel, every two pixels, and resizing the foveals at regular percentage increments.

7. The method of claim 1, wherein the mathematical transformation includes, but is not limited to, wavelet, beamlet, ridgelet, curvelet, and contourlet transformation.

8. The method of claim 7, wherein the mathematical transformation is applied in vertical, horizontal and diagonal directions of the polar domain foveal.

9. The method of claim 1, wherein the feature density is quantified by calculating a numerical indicator related to pixels in the feature-extracted foveal.

10. The method of claim 9, wherein the numerical indicator is standard deviation of color or gray scale of all of the pixels.

11. The method of claim 1, wherein the rotation-invariant orientation is defined as a column with a highest feature density of the feature-extracted foveal and is located and shifted to a particular location.

12. The method of claim 11, wherein the particular location is last column of the feature-extracted foveal.

13. The method of claim 1, wherein the set of foveal indices contains at least one dimension and each of the foveal indices is one of a range of integers.

14. The method of claim 13, wherein each of the foveal indices is calculated by calculating cross-correlation with respect to reference foveals; each of said reference foveals is comprised of a distinct set of pixels.

15. The method of claim 13, wherein each of the foveal indices is calculated by a self-indexing scheme.

16. The method of claim 15, the self-indexing scheme includes:
dividing the canonical foveal into a plurality of regions of pixels;
calculating mean value of color or gray scale of all of the pixels in each of the regions; and
converting the mean value to one of the foveal indices.

17. The method of claim 1, further comprising:
(m) segmenting a query imagery data into one or more query foveals;
(n) creating a canonical query foveal for one of the one or more query foveals;
(o) calculating a set of query indices for the canonical query foveal using the same procedure as used for creation of the foveal indices;
(p) comparing the canonical query foveal against each of the stored canonical foveals in a respective bin of the database, wherein the respective bin corresponds to the set of query indices;
(q) storing a matched canonical foveal into a matched table;
repeating (n)-(q) for each of remain of the one or more query foveals; and
determining a matched image from the spatial imagery data in accordance with a set of matching rules.

18. The method of claim 17, said comparing further includes calculating a cross-correlation coefficient between the canonical query foveal and each of the stored canonical foveals, wherein the matched canonical foveal has the cross-correlation coefficient greater than a predefined percentage.

19. The method of claim 17, wherein the set of matching rules is based on parameters that include the number of the matched foveals and location of each of the matched foveals, whereby a large number of the matched foveals along with a group of tightly clustered matched foveals indicates a high probability of matching.

20. A system for rapid object recall within spatial imagery data, where the object is a portion of the spatial imagery data, the system comprising:
an I/O interface;
a communication interface;
a secondary memory;
a main memory for storing computer readable code for an application module;
at least one processor coupled to the main memory, the secondary memory, the I/O interface, and the communication interface, said at least one processor executing the computer readable code in the main memory to cause the application module to perform operations of:
segmenting each of the spatial imagery data into at least one foveal sample, each of the at least one foveal sample has a shape and includes a plurality of adjacent pixels located at a unique position in the each of the spatial imagery data;
transforming said each of the at least one foveal sample to a polar domain foveal in a local polar coordinate system;
applying a mathematical transformation to the polar domain foveal to create a feature-extracted foveal;
when feature density of the feature-extracted foveal is greater than a predefined threshold,
creating a canonical foveal by shifting the feature-extracted foveal to a rotation-invariant orientation;
calculating a set of foveal indices that categorizes the canonical foveal; and
storing the canonical foveal in a database that is subdivided into more than one bins with each of the more than one bins corresponding to the set of foveal indices of the canonical foveal.

21. The system of claim 20, further comprises operations of optionally generating a group of scaled foveals from the polar domain foveal in different scales, wherein the group of scaled foveals ensures scale-invariance.

22. The system of claim 20, further comprising operations of:
(m1) segmenting a query imagery data into one or more query foveals;
(n1) creating a canonical query foveal for one of the one or more query foveals;
(o1) calculating a set of query indices for the canonical query foveal using the same procedure as for creation of the foveal indices;
(p1) comparing the canonical query foveal against each of the stored canonical foveals in a respective bin of the database, wherein the respective bin corresponds to the set of query indices;
(q1) storing a matched canonical foveal into a matched table;
repeating (n1)-(q1) for each of remain of the one or more query foveals; and
determining a matched image from the spatial imagery data in accordance with a set of matching rules.

23. A computer program product including a computer usable medium having computer readable code embodied in the medium for causing an application module to execute on a computer for rapid object recall within spatial imagery data, where the object is a portion of the spatial imagery data, the computer program product comprising, computer readable code for segmenting each of the spatial imagery data into at least one foveal sample in a computer system, each of the at least one foveal sample has a shape and includes a plurality of adjacent pixels located at a unique position in the each of the spatial imagery data;

computer readable code for transforming said each of the at least one foveal sample to a polar domain foveal in a local polar coordinate system;

computer readable code for applying a mathematical transformation to the polar domain foveal to create a feature-extracted foveal;

when feature density of the feature-extracted foveal is greater than a predefined threshold, computer readable code for creating a canonical foveal by shifting the feature-extracted foveal to a rotation-invariant orientation;

computer readable code for calculating a set of foveal indices that categorizes the canonical foveal; and computer readable code for storing the canonical foveal in a database that is subdivided into more than one bins with each of the more than one bins corresponding to the set of foveal indices of the canonical foveal, wherein the database is located in a storage device coupled to the computer system.

24. The computer program product of claim 23, further comprises computer readable code for optionally generating a group of scaled foveals from the polar domain foveal in different scales, wherein the group of scaled foveals ensures scale-invariance.

25. The computer program product of claim 23, further comprising:

(m2) computer readable code for segmenting a query imagery data into one or more query foveals;

(n2) computer readable code for creating a canonical query foveal for one of the one or more query foveals;

(o2) computer readable code for calculating a set of query indices for the canonical query foveal using the same procedure as for creation of the foveal indices;

(p2) computer readable code for comparing the canonical query foveal against each of the stored canonical foveals in a respective bin of the database, wherein the respective bin corresponds to the set of query indices;

(q2) computer readable code for storing a matched canonical foveal into a matched table;

computer readable code for repeating (n2)-(q2) for each remaining of the one or more query foveals; and computer readable code for determining a matched image from the spatial imagery data in accordance with a set of matching rules.

\* \* \* \* \*